United States Patent [19]

Mochizuki et al.

[11] Patent Number: 4,911,958
[45] Date of Patent: Mar. 27, 1990

[54] LIQUID CRYSTAL DEVICE

[75] Inventors: Hideaki Mochizuki; Tsuyoshi Uemura, both of Higashiosaka; Tooru Tamura, Ikeda; Hiroshi Satani, Neyagawa; Masakazu Uekita; Makoto Murata, both of Kobe, all of Japan

[73] Assignee: Matsushita Electric Industrial Co., Ltd., Osaka, Japan

[21] Appl. No.: 275,899

[22] Filed: Nov. 25, 1988

[30] Foreign Application Priority Data

Nov. 25, 1987 [JP] Japan .................................. 62-298572
Nov. 25, 1987 [JP] Japan .................................. 62-298573
Nov. 25, 1987 [JP] Japan .................................. 62-298574

[51] Int. Cl.$^4$ ................................................. C09K 3/34
[52] U.S. Cl. ............................................... 428/1; 350/341
[58] Field of Search ................. 428/1; 350/341, 350 R

[56] References Cited

U.S. PATENT DOCUMENTS 4,615,919 10/1986 Inoue et al. ......................... 350/341

Primary Examiner—Alexander S. Thomas
Attorney, Agent, or Firm—Wenderoth, Lind & Ponack

[57] ABSTRACT

A liquid crystal device is disclosed wherein a pair of liquid crystal supporting plates each having a molecular alignment controlling film formed thereon through the Langmuir-Blodgett method singly orlaminatedly a monomolecular film having as a main component a polyamide compound having a long-chain alkyl substituent in its side chain and a property to overspread a surface of water to form a monomolecular film is oppositely held via a spacer which is adhered on the side on which the molecular alignment controlling film is formed, and a liquid crystal material is injected and held into the space produced between the films thus oppositely held to each other thereby to align the molecules of liquid crystal to the azimuth parallel to the dipping direction of the substrate. A liquid crystal device thus manufactured exhibits a uniform and indefective molecular alignment condition.

7 Claims, 2 Drawing Sheets

LIQUID CRYSTAL DEVICE

BACKGROUND OF THE INVENTION

1. Field of the Invention

This invention relates to a molecular aligning method for liquid crystals and a liquid crystal device using said molecular aligning method.

2. Description of the Prior Art

At present, the liquid crystal display device (LCD) has been widely used in every possible field of application including, for example, wristwatch, game machine, color television and lap-top computers. Along with this trend, there is a rapidly growing demand for high performance LCDs. In order to respond to such a demand, high performance liquid crystal display devices have been developed including those using an active matrix display, ferroelectric liquid crystal display, super-twisted nematic liquid crystal display or the like.

As one of the essential factors for determining the performance of liquid crystal device reference can be made to alignment control technology. This technology is a process for aligning liquid crystal molecules in a definite direction all over the surface of a display device, on which the displaying quality thereof largely depends. If the alignment is not controlled satisfactorily, then critical defects such as, for example, uneven display, reduced contrast and reduced performance due to aging will take place. The importance of the alignment control technology is to be emphasized in common on not only the twisted nematic type (TN type) LCDs but also various types of high performance liquid crystal devices mentioned above, which means that this technology is becoming increasingly important.

Conventional methods for achieving the alignment control of liquid crystal molecules are the rubbing method in which after a polymer such as, for example, polyimide has been coated on the surface of an electrode to form a film thereon, the surface thus obtained is rubbed with cloth or the like, and the oblique evaporation method in which a material such as, for example, $SiO_2$ is evaporated on the surface of an electrode from an oblique direction. Of these, the rubbing method is being mainly used because of its simplicity and low cost. Under such a circumstance that the trend to make liquid crystal display devices largely displayable in size and highly dense in structure is in progress, it becomes difficult to obtain a uniform and high quality display all over the surface thereof using the method in accordance with the prior art in which an alignment controlling film is formed and only rubbed. Namely, defect resulting from the generation of fiber dust from a rubbing cloth and difficulty in making the rubbing force uniform during the rubbing process, which had previously not been given much attention has begun to be examined closely accompanying the increasing trend to make the liquid crystal device of high performance. Particularly, none of the above-mentioned high performance liquid crystal display devices could be satisfactorily produced by following the methods of the prior art.

Referring to ferroelectric liquid crystal devices, particularly, different from previous twisted nematic ones, bistability of the alignment condition must be maintained. Accordingly, if the initial molecular alignment treatment is made excessively sufficient, the alignment condition will be stabilized in one direction only, so that the performance as the ferroelectric liquid crystal device is lost. On the other hand, if it is made insufficient, the alignment will become uneven. As a result, the alignment technology of ferroelectric liquid crystal device has an individuality and difficulty that can not possibly compare with those in accordance with the prior art.

The method disclosed in Japanese patent application Laid-Open No. 62-291621, Eguchi et al, uses an alignment controlling film of ferroelectric liquid crystal. A polymeric coating film made of a monomolecular film or a laminated monomolecular film of a polymeric compound having a hydrophilic part and a hydrophobic part in the molecule is employed. With this method, as Eguchi et al clearly showed, if rubbing is not made, a reduction in alignment controlling force results, thus the unevenness of alignment being produced. Also, Japanese patent application Laid-Open No. 63-126578, Uekita et al, points to a liquid crystal alignment film as one of applications of a composite part including a thin film formed by laminating a polymeric compound through the Langmuir-Blodgett method, but does not show the specificity of molecular alignment of ferroelectric liquid crystal.

Then, the ferroelectric liquid crystal device has a liquid crystal layer having a thickness which is extremely thin such as to be one-half or less that of the previous twisted nematic liquid crystal device, so that defect generation during manufacturing through the secondary treatment called rubbing process can be outstandingly increased. Accordingly, it is desired that the alignment control be achieved with no use of the rubbing process.

SUMMARY OF THE INVENTION

This invention is to provide a uniform and indefective alignment condition all over the surface of a substrate without using the secondary treatment called rubbing for effecting the molecular alignment of liquid crystal.

In order to attain the above-mentioned object, a method in accordance with invention forms an alignment controlling film on at least one of a pair of substrates on which electrodes are formed. The alignment controlling film is prepared by forming through the Langmuir-Blodgett (LB) method, a monomolecular film having as a main component a polyamide compound which has a long-chain alkyl substituent in its side chain and the property such as to overspread on a surface of water to form a monomolecular film singly or laminatedly thereon. The liquid crystal supporting plates each having said alignment controlling film are held in pair confronting each other through a spacer adhered to the side on which said alignment controlling film is formed, and a liquid crystal material is injected and held in a space obtained between said pair of liquid crystal supporting plates. The liquid crystal molecules are aligned in the direction parallel to the direction in which said pair of substrates are dipped.

By using the above-mentioned alignment control method to control molecular alignment of a liquid crystal device, it becomes possible to produce a device which is uniform in structure. Thus it becomes possible to eliminate difference in the alignment direction and a high quality display can be provided all over the surface of an electrode without using the second treatment called rubbing. Thus, unevenness of the molecular alignment caused by the rubbing process and generation of dust accompanying with the rubbing process, and creation of defects resulting therefrom can be eliminated. In addition, in contrast to a compound having a low molecular weight, a polymeric amide having the property of forming monomolecular film is employed so that a laminated film can be uniformly formed on irregularities existing on the electrode surface.

DETAILED DESCRIPTION OF THE INVENTION

Group A Examples

Figure 1:
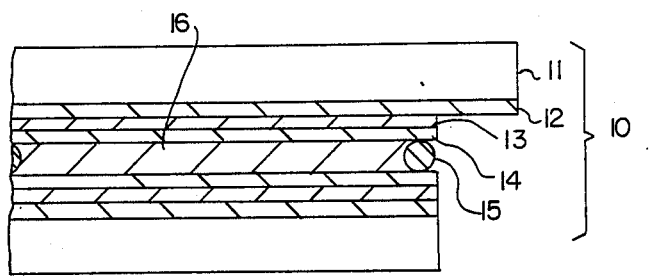
FIG. 1 is a schematic diagram showing a liquid crystal display device in accordance with this invention.

As one of the concrete examples, a TN-type liquid crystal display device produced by using mixed LB film will be described first. FIG. 1 is a schematic diagram of a liquid crystal display device of this invention. In FIG. 1, reference numerals 11, 12, 13, 14, 15 and 16 indicate a substrate, transparent electrode layer, dielectric film, alignment controlling film, sealing resin and liquid crystal layer, respectively.

Figure 2:
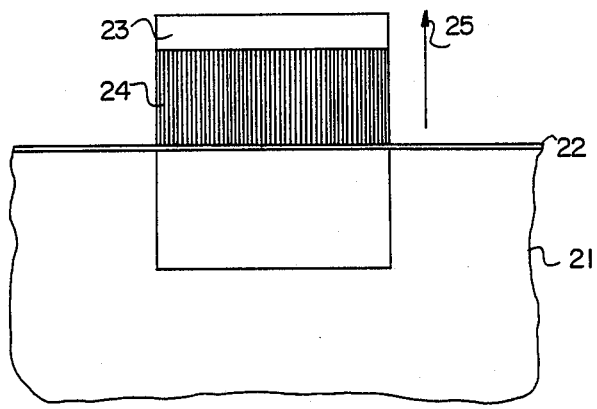
FIG. 2 is a schematic diagram for explaining the LB method.

As the method by which a monomolecular film is transferred to form on a substrate, the Langmuir-Blodgett method has been generally used in the past and the film formed by this method is called an LB film. FIG. 2 shows the LB method schematically. In FIG. 2, reference numerals 21, 22, 23, 24 and 25 indicate a glass substrate, monomolecular film transferred to form, the direction to be lifted, monomolecular film overspread on the surface of water, and water, respectively. At first, a mixture of a compound having an ability to form a monomolecular film and a liquid crystal is melted into an organic solvent and then droplets of the solution thus obtained is dropped into water to overspread said mixture on the surface thereof. Next, the monomolecular film 24 of said mixture overspread on the surface of water is compressed until a specified surface pressure is attained thereby to make a so-called solid film. Further, while the surface pressure of said monomolecular film 24 over-spread on the surface of water is being held constant so as not to destroy the solid state thereof, the glass substrate 21 having a specific pattern of a transparent electrode made of indium and tin oxide (ITO electrode) formed in advance is moved up and down across said monomolecular film 24 overspread on the surface of water thereby transferring it to form on the surface of the substrate. By changing the number of times of going across the surface of the water, lamination can be made as desired.

Figure 3:
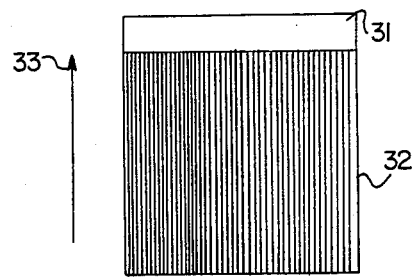
FIG. 3 is a diagram showing a film formed laminatedly on a substrate by the LB method.

FIG. 3 shows a laminated film formed on the surface a substrate by the LB method. In FIG. 3, reference numerals 31, 32 and 33 indicate a part where not yet laminated, part where lamination was already made and the direction to be lifted, respectively. Also, one end of a transparent electrode has the part where it is not yet laminated 31 left to make sure of electrical conductivity. In addition, it permits dielectric thin film made of, for example, silicon oxide to be formed on ITO electrode in advance and the LB film is laminated thereon.

Figure 4:
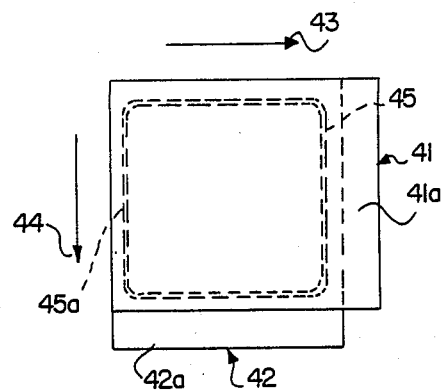
FIG. 4 is a diagram showing a TN-type liquid crystal cell obtained in accordance with this invention.

Two glass plates each having been formed LB film as the alignment controlling film by the above-mentioned method are held so that the surfaces on which the LB films are formed may confront each other and then they are adhered. FIG. 4 shows a twisted-nematic (TN) type liquid crystal cell obtainable in accordance with this invention. In FIG. 4, reference numerals 41, 42, 43, 44 and 45 indicate an upper substrate, lower substrate, the direction in which the upper substrate is lifted, the direction in which the lower substrate is lifted, and a sealing resin, respectively. Namely, as shown in FIG. 4, on the four sides excepting a part of one side of one of the two glass substrates is printed an acid anhydride setting epoxy resin composition dispersedly having a spacer with a specified diameter thereby to form the sealing resin 45. The composition thus printed is cured by heating at 140° C. for three hours under the application of a pressure, thus the two glass substrates being adhered. A set of the two glass plates thus adhered is called a cell and a liquid crystal material is injected through this opening thereinto under a reduced-pressure condition. After injection has been completed, the opening is sealed using an acid anhydride setting epoxy resin composition, thus the liquid crystal cell of this invention being completed.

As the compound having an ability to form a monomolecular film as shown above, so-called amphipathic materials which have the hydrophilic and hydrophobic properties in combination, more concretely, alcohol having a long-chain alkyl with a carbon number of 16 to 22 such as, for example, stearic acid (metallic salts) generally used for forming LB film, carboxylic acid, metallic salt and their derivatives, or polyimide resin having a long-chain alkyl substituent such as, for example, those shown in the Japanese patent application Laid-Open Nos. 62-61673 and 62-129317 can be used singly or combinedly. In addition, from the viewpoint of heat resistance and stability of a film to be formed, it is preferable to use those having a polymeric compound as the main component, particularly, either a polyamide compound having a long-chain alkyl substituent in its side chain, or a compound having a long-chain alkyl ester unit of polyamic acid is most preferable. In addition, as the liquid crystal to be mixed, liquid crystals such as, for example, Schiff's base, azo, azoxy, biphenyl, cyclohexane, cyclohexane carboxylphenyl ester, phenyl cyclohexane, biphenyl cyclohexane, pyrimidine, dioxane, thioester, diester, terphenyl and cinnamonitryl system ones can be used singly or combined to make a mixed liquid crystal.

A liquid crystal display device using a mixed LB film containing liquid crystal as one component, as shown above, as the alignment controlling film exhibits such a property that the molecular alignment of liquid crystal can be provided without being subjected to the rubbing process. Furthermore, as compared with the case that LB film is used singly, mixed use of liquid crystal materials make it possible to further largely improve the molecular alignment property, outstandingly decrease the unevenness of alignment and provide a high quality display characteristic.

Hereinafter, examples of a twisted nematic (TN) type liquid crystal display device in accordance with this invention will be described first.

EXAMPLE A1

An ITO electrode having a thickness of 200 nm was evaporated in vacuum using a pattern-formed mask on one side of a glass plate of 60 mm×50 mm in size. Next, a silicon oxide film having a thickness of 100 nm was formed on the ITO electrode as a dielectric layer by the vacuum evaporation coating technology. On the other hand, a mixture of a polyimide precursor (PIP) obtained by reacting an acidic chloride of pyromellitic acid distearyl ester with 4,4'-diaminodiphenyl ether and a liquid crystal (Melk's product-trade-name as ZLI 3220) at a ratio of 1:1 is melted into a mixed solvent of dimethylacetoamide and chloroform. Using the solution thus obtained, a mixed LB film of a PIP and liquid crystal was laminated in five layers through the above-mentioned method on the glass plate having said ITO electrode evaporatedly formed. Two glass plates processed in the same manner were prepared and a cell was, as shown in FIG. 4, constructed so as to make the lifting directions of the plates during the formation of LP film a right angle with each other. On one of the two glass plates was printed an acid anhydride setting epoxy resin composition dispersedly having glass fibers each being 7 μm in diameter at a width of 1 mm peripherally on the four sides thereof excepting one side which has a part of 5 mm long to be left unprinted at the central portion thereof. Next, the two plates were held, as shown in FIG. 1, so as to have the electrode surfaces confronted to each other and a pressure was applied thereon at 150° C. for one hour thereby to undergo a curing adhesion. After adhesion, a liquid crystal material (Melk's ZLI 3225) was injected from said opening thereinto under the application of a reduced-pressure. After injection, the opening was sealed with a commercially available acid anhydride setting epoxy resin composition, thus so-called twisted nematic (TN) type liquid crystal cell being completed. The TN-type liquid crystal cell thus completed exhibited an outstanding molecular alignment condition with no unevenness.

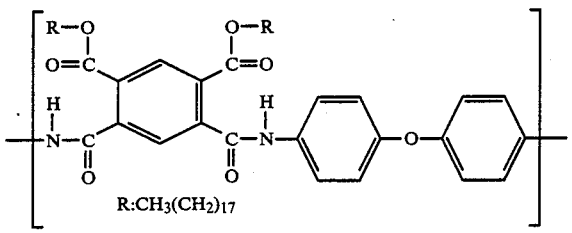

EXAMPLE A2

Using a mixed LB film of a polyimide isoindroquinazolinedione precursor (PIIQP) obtained by reacting an oxide chloride of pylomellitic acid distearyl ester with 2,5-diaminobenzamide, PIP and liquid crystal (Melk's ZLI 3220) at a ratio of 1:1:1, a TN-type liquid crystal cell was prepared in the same way as in Example A1. The cell thus obtained exhibited an outstanding molecular alignment condition with no unevenness.

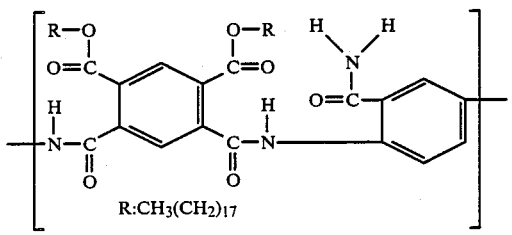

EXAMPLE A3

Using a mixed LB film of a PIP, stearyl alcohol and liquid crystal (Melk's ZLI 3220) at a ratio of 1:1:1, a TN-type liquid crystal cell was prepared in the same way as in Example A1. The cell thus obtained exhibited an outstanding molecular alignment condition with no unevenness.

EXAMPLE A4

Using a mixed LB film of a PIIQP, PIP, stearyl alcohol and liquid crystal (Melk's ZLI 3220) at a ratio of 1:1:1:1, a TN-type liquid crystal cell was prepared in the same way as in Example A1. The cell thus obtained exhibited an outstanding molecular alignment condition with no unevenness.

EXAMPLE A5

Using a mixed LB film of a PIP and liquid crystal (Melk's ZLI 3220) at a ratio of 1:1, a TN-type liquid crystal cell was prepared in the same way as in Example A1. The cell thus obtained exhibited an outstanding molecular alignment condition with no unevenness.

EXAMPLE A6

Using a mixed LB film of a PIP, stearyl alcohol and liquid crystal (Melk's ZLI 3489) at a ratio of 1:1:1, a TN-type liquid crystal cell was prepared in the same way as in Example A1. The cell thus obtained exhibited an outstanding molecular alignment condition with no unevenness.

EXAMPLE A7

Using a mixed LB film of a PIP, stearyl alcohol and liquid crystal (Melk's ZLI 3489) at a ratio of 1:1:1, a TN-type liquid crystal cell was prepared in the same way as in Example A1. The cell thus obtained exhibited an outstanding molecular alignment condition with no unevenness.

EXAMPLE A8:

Using a mixed LB film of a PIIQP, PIP and liquid crystal (Melk's ZLI 3489) at a ratio of 1:1:1, a TN-type liquid crystal cell was prepared in the same way as in Example A1. The cell thus obtained exhibited an outstanding molecular alignment condition with no unevenness.

GROUP B EXAMPLES

Next, examples of a ferroelectric liquid crystal device in accordance with this invention will be described. Substrate and LB film to be formed thereon for use in making a ferroelectric liquid crystal device respectively can be made of the same ones as those used in making a TN-type liquid crystal device excepting that only the liquid crystal to be injected thereinto is different from each other. At first, examples in which a LB film having no liquid crystal mixed is used as an alignment controlling film will be described.

Figure 5:
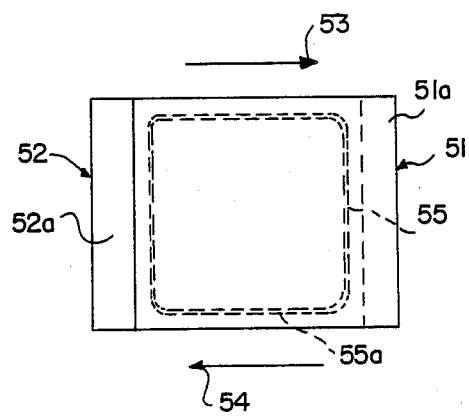

In these examples, the same substrate as in Group A Examples was used and a LB film having no liquid crystal mixed and being made of a polyamide having a long-chain alkyl substituent was formed on the surface thereof by the method shown in Group A Examples. Two glass substrates each having been formed a LB film as the alignment controlling film were held so that the surfaces on which the LB film was coated can confront each other and then be adhered. FIG. 5 shows a ferroelectric liquid crystal display device obtained by the method of this invention. In FIG. 5, reference numerals 51, 52, 53, 54 and 55 indicate an upper substrate, lower substrate, the direction to lift the upper substrate, the direction to lift the lower substrate and a sealing resin. Namely, as shown in FIG. 5, on the four sides excepting a part of one side of the two glass substrates was printed an acid anhydride setting epoxy resin composition dispersedly having a spacer with a specific diameter to form the sealing resin 55. The two glass substrates were heated at 140° C. for three hours under the application of pressure thereby to have them adhered to each other. A set of two glass plates thus adhered to each other is called a cell and a liquid crystal material was injected through this opening thereinto under the reduced-pressure condition. The ferroelectric liquid crystal material to be injected can be selected singly or combinedly to make a mixed liquid crystal from the group consisting of Schiff's base, non-Schiff's base, azo, azoxy, biphenyl and aromatic ester systems, those having a ring substituent such as, for example, cyano, and those having a heterocycle. Further, a ferroelectric one can be selected from among mixed liquid crystal materials which are made of these ferroelectric ones and other non-ferroelectric ones. It is preferable to select a liquid crystal having such a property that when cooled from an elevated temperature, the liquid crystal phase can be shifted from an isotropic liquid crystal successively to a chiral nematic, smectic A and chiral smectic C phase. After injection has been completed, the opening was sealed with an acid anhydride setting exoxy resin composition, thus the liquid crystal cell being completed. A ferroelectric liquid crystal display device using, as shown above, a monomolecular film or a laminated monomolecular film containing a polyamide compound having the long-chain alkyl substituent in its side-chain as the main component has the property to effect molecular alignment of a ferroelectric liquid crystal with no use of the rubbing process and yet provide a high quality display vision with a reduced unevenness of alignment.

Hereinafter, this invention will be described in detail using concrete examples.

EXAMPLE B1

An ITO electrode having a thickness of 200 nm was evaporated in vacuum using a pattern-formed mask on one side of a glass plate of 60 mm×50 mm in size. Next, a silicon oxide film having a thickness of 100 nm was formed on the ITO electrode as a dielectric layer by the vacuum evaporation coating technology. On the other hand, a polyimide precursor (PIP) obtained by reacting an acidic chloride of pyromellitic acid distearyl ester with 4,4'-diamino-diphenyl ether was melted into a mixed solvent of dimethyl aceto amide and chloroform.

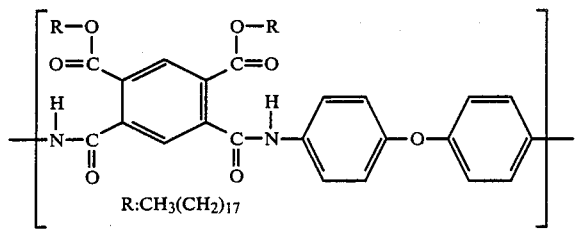

Using the solution thus obtained, a LB film of PIP was laminated in five layers through the above-mentioned method on the glass plate having said ITO electrode evaporatedly formed. Two glass plates processed in the same manner were prepared and a cell was constructed in such a manner that the upper substrate 51 and lower substrate 52 have, as shown in FIG. 5, the lifting direction 53 and the lifting direction 54 which are opposite to each other during the formation of LB film, respectively. On the surface on which a transparent electrode layer has been formed of the lower substrate 52 was printed an acid anhydride setting epoxy resin composition dispersedly having plastic beads each being 2.0 μm in diameter at a width of 1 mm peripherally on the four sides thereof excepting one side which has a part of 5 mm long to be left unprinted at the central portion thereof, thereby forming the sealing resin 55. Next, the two glass plates were, as shown in FIG. 1, held so as to have the transparent electrode layers 12 confront each other and a pressure was applied thereon at 140° C. for three hours to undergo the curing adhesion. After adhesion, a ferroelectric liquid crystal material (Melk's ZLI 3489) was injected from an opening thereinto under the application of a reduced-pressure. After injection, the opening was sealed with a commercially available acid anhydride setting epoxy resin composition, thus a ferroelectric liquid crystal (FLC) cell being completed. The FLC cell thus obtained was subjected to the initial alignment treatment in such a manner that it is preliminarily heated to 100° C. and then cooled gradually. Thus, a FLC cell exhibiting an outstanding molecular alignment condition with no unevenness was obtainable.

EXAMPLE B2

Using a LB film of a polyimide isoindroquinazolinedione precursor (PIIQP) obtained by reacting an oxide chloride of pyromellitic acid distearyl ester with 2,5-diaminobenzamide, a FLC cell having said ZLI 3489 as the liquid crystal to be injected was prepared in the same way as in Example B1. The cell thus prepared was subjected to the initial alignment treatment in such a manner that it is preliminarily heated to 100° C. and then cooled gradually. Thus, a FLC cell exhibiting an outstanding molecular alignment condition with no unevenness was obtainable.

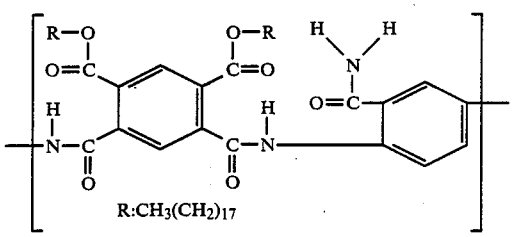

EXAMPLE B3

Using a LB film made of a mixture of a PIP and stearyl alcohol at a ratio of 1:1, FLC cell having said ZLI 3489 as the liquid crystal to be injected was prepared in the same manner as in Example B1. The cell thus prepared was subjected to the initial alignment treatment in such a manner that it is preliminarily heated to 100° C. and then cooled gradually. Thus, a FLC cell exhibiting an outstanding molecular alignment condition with no unevenness was obtainable.

EXAMPLE B4

Using a LB film made of a mixture of a PIIQP, PIP and stearyl alcohol at a ratio of 1:1:1, a FLC cell having said ZLI 3489 as the liquid crystal to be injected was prepared in the same manner as in Example B1. The cell thus prepared was subjected to the initial alignment treatment in such a manner that it is preliminarily heat to 100° C. and then cooled gradually. Thus, a FLC cell exhibiting an outstanding molecular alignment condition with no unevenness was obtainable.

EXAMPLE B5

A FLC cell was prepared in the same way as in Example B1 excepting that a Chisso Corporation's product trade-named as CS 1015 was used as the ferroelectric liquid crystal to be injected. The FLC cell thus prepared was subjected to the initial alignment treatment in such a manner that it is preliminarily heated to 110° C. and then cooled gradually. Thus, a FLC cell exhibiting an outstanding molecular alignment condition with no unevenness was obtainable.

EXAMPLE B6

A FLC cell was prepared in the same way as in Example B2 excepting that a Chisso Corporation's product trade-named as CS 1015 was used as the ferroelectric liquid crystal to be injected. The FLC cell thus prepared was subjected to the initial alignment treatment in such a manner that it is preliminarily heated 110° C. and then cooled gradually. Thus, a FLC cell exhibiting an outstanding molecular alignment condition with no unevenness was obtainable.

EXAMPLE B7

A FLC cell was prepared in the same way as in Example B3 excepting that a Chisso Corporation's product trade-named as CS 1015 was used as the ferroelectric liquid crystal to be injected. The FLC cell thus prepared was subjected to the initial alignment treatment in such a manner that it is preliminarily heated to 110° C. and then cooled gradually. Thus, a FLC cell exhibiting an outstanding molecular alignment condition with no unevenness was obtainable.

EXAMPLE B8

A FLC cell was prepared in the same way as in Example B4 excepting that Chisso Corporation's product trade-named as CS 1015 was used the ferroelectric liquid crystal to be injected. The cell thus prepared was subjected to the initial alignment treatment in such a manner that it is preliminarily heated to 110° C. and then cooled gradually. Thus, a FLC cell exhibiting an outstanding molecular alignment condition with no unevenness was obtainable.

COMPARATIVE EXAMPLE B1

Using a LB film made of a poly-octadecene-1-maleic anhydride, a FLC cell using Melk's ZLI 3489 as the liquid crystal to be injected was prepared in same way as in Example B1. The FLC cell thus prepared was subjected to the initial alignment treatment in such a manner that it is preliminarily heated to 100° C. and then cooled gradually. The FLC cell thus obtained, however, was unsatisfactory in bistability as a ferroelectric liquid crystal display device and yet large in unevenness of alignment of liquid crystal molecules.

GROUP C EXAMPLES

Furthermore, examples of a liquid crystal device adapted to apply this invention whose alignment controlling film has a liquid crystal as its component and whose liquid crystal to be injected is a ferroelectric one will be described below.

The liquid crystal to be mixed used into the alignment controlling film can be selected to be used singly or combinedly to make a mixed liquid crystal from the group consisting of Schiff's base, azo, azoxy, biphenyl, cyclohexane, cyclohexanecarboxylphenyl ester, phenylcyclohexane, biphenylcyclohexane, pyrimidine, dioxane, thioester, diester, terphenyl, cinnamonitryl system and other system liquid crystals. A ferroelectric liquid crystal display device using such a mixed LB film that contains a liquid crystal as its one component as the alignment controlling film has a property to align the liquid crystal molecules even if the rubbing process is not carried out, and yet an improved molecular alignment through mixedly use of liquid crystal materials as compared with the case that the LB film is used singly, thus being capable of providing a high quality display characteristic without no unevenness of molecular alignment.

Hereinafter, concrete examples of this invention will be shown in detail.

EXAMPLE C1

An ITO electrode having a thickness of 200 nm was evaporated in vacuum using a pattern-formed mask on one side of a glass plate of 60 mm × 50 mm in size. Next, a silicon oxide film having a thickness of 100 nm was formed on the ITO electrode as a dielectric layer by the vacuum evaporation coating technology. On the other hand, a mixture of a polyimide precursor (PIP) obtained by reacting an acidic chloride of pyromellitic acid distearyl ester with 4,4'-diaminodiphenyl ester and a liquid crystal (Melk's ZLI 3489) at a ratio of 1:1 was melted into a mixed solvent of dimethylacetoamide and chloroform. Using the solution thus obtained, a mixed LB film of a PIP and liquid crystal material was laminated in five layers through the above-mentioned method on the glass plate having said ITO electrode evaporatedly formed.

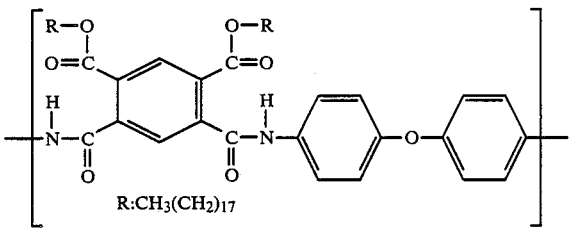

Two glass plates processed in the same manner was prepared and a cell was constructed in such a manner that the upper substrate 51 and the lower substrate 52 have, as shown in FIG. 5, the lifting direction 53 and the lifting direction 54 which are opposite to each other during the formation of LB film, respectively. On the surface on which a transparent electrode layer has been formed of the lower substrate 52 was printed an acid anhydride setting epoxy resin composition dispersedly having plastic beads each being 2.0 μm in diameter at a width of 1 mm peripherally on the four sides thereof excepting a part of 5 mm long to be left unprinted at the central portion thereof, thereby forming the sealing resin 55. Next, the two glass plates were, as shown in FIG. 1, held so as to have the transparent electrode layers 12 confronted to each other and a pressure was applied thereon at 140° C. for three hours to undergo the curing adhesion. After adhesion, a ferroelectric liquid crystal material (Melk's ZLI 3489) was injected from said opening thereinto under the application of a reduced-pressure. After injection, the opening was sealed with a commercially available acidic anhydride setting epoxy resin composition, thus a ferroelectric liquid crystal (FLC) cell being completed. The FLC cell thus obtained was subjected to the initial alignment treatment in such a manner that it is preliminarily heated to 100° C. and then cooled gradually. Thus, a FLC cell exhibiting an outstanding molecular alignment condition with no unevenness was obtainable.

EXAMPLE C2

Using a mixed LB film of a polyimide isoindroquinazolinedione precursor (PIIQP) obtained by reacting an oxide chloride of pyromellitic acid distearyl ester with 2,5-diaminobenzamide, PIP and liquid crystal (Melk's ZLI 3484) at a ratio of 1:1:1, a FLC cell having the ZLI 3484 as the liquid crystal to be sealably injected was prepared in the same way as in Example C1. The FLC cell thus prepared was subjected to the initial alignment treatment in such a manner that it is preliminarily heated to 100° C. and then cooled gradually. Thus, a FLC cell exhibiting an outstanding molecular alignment condition with no unevenness was obtainable.

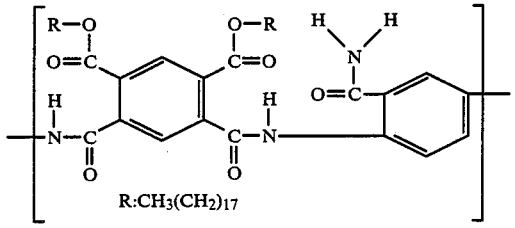

EXAMPLE C3

Using a mixed LB film of a PIP, stearyl alcohol and liquid crystal (Melk's ZLI 3489) at a ratio of 1:1:1, a FLC cell having the ZLI 3489 as the liquid crystal to be sealably injected was prepared in the same way as in Example C1. The FLC cell thus prepared was subjected to the initial alignment treatment in such a manner that it is preliminarily heated to 100° C. and then cooled gradually. Thus, a FLC cell exhibiting an outstanding molecular alignment condition with no unevenness was obtainable.

EXAMPLE C4

Using a mixed LB film of a PIP, stearyl alcohol and liquid crystal (Chisso's CS 1014) at a ratio of 1:1:1, a FLC cell having the ZLI 3489 as the liquid crystal to be sealably injected was prepared in the same way as in Example C1. The FLC cell thus prepared was subjected to the initial alignment treatment in such a manner that it is preliminarily heated to 100° C. and then cooled gradually. Thus, a FLC cell exhibiting an outstanding molecular alignment condition with no unevenness was obtainable.

EXAMPLE C5

Using a mixed LB film of a PIP, the following compound (PA) and liquid crystal (Chisso's CS 1014) at a ratio of 1:1:1, a FLC cell having the ZLI 3489 as the liquid crystal to be sealably injected was prepared in the same way as in Example C1. The FLC cell thus prepared was subjected to the initial alignment treatment in such a manner that it is preliminarily heated to 100° C. and then cooled gradually. Thus, a FLC cell exhibiting an outstanding molecular alignment condition with no unevenness was obtainable.

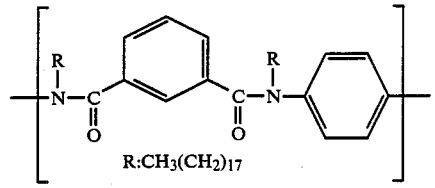

EXAMPLE C6

Using a mixed LB film a PIP, stearyl alcohol and liquid crystal (Chisso's CS 1014) at a ratio of 1:1:1, a FLC cell having the ZLI 3654 as the liquid crystal to be sealably injected was prepared in the same way as in Example C1. The FLC cell thus prepared was subjected to the initial alignment treatment in such a manner that it is preliminarily heated to 100° C. and then cooled gradually. Thus, a FLC cell exhibiting an outstanding molecular alignment condition with no unevenness was obtainable.

EXAMPLE C7

Using a mixed LB film of a PIP, PIIQP, stearyl alcohol and liquid crystal (Melk's ZLI 3489) at a ratio of 1:1:1:1, a FLC cell having the ZLI 3489 as the liquid crystal to be sealably injected was prepared in the same way as in Example C1. The FLC cell thus prepared was subjected to the initial alignment treatment in such a manner that it is preliminarily heated to 100° C. and then cooled gradually. Thus, a FLC cell exhibiting an outstanding molecular alignment condition with no unevenness was obtainable.

EXAMPLE C8

Using a mixed LB film of a PIP and liquid crystal (Melk's ZLI 3220) at a ratio of 1:1, a FLC cell having the ZLI 3484 as the liquid crystal to be sealably injected was prepared in the same way as in Example C1. The FLC cell thus prepared was subjected to the initial alignment treatment in such a manner that it is preliminarily heated to 100° C. and then cooled gradually. Thus, a FLC cell exhibiting an outstanding molecular alignment condition with no unevenness was obtainable.

EXAMPLE C9

Using a mixed LB film of a PIP, PIIQP and liquid crystal (Melk's ZLI 3320) at a ratio of 1:1:1, a FLC cell having the ZLI 3489 as the liquid crystal to be sealably injected was prepared in the same way as in Example C1. The FLC cell thus prepared was subjected to the initial alignment treatment in such a manner that it is preliminarily heated to 100° C. and then cooled gradually. Thus, a FLC cell exhibiting an outstanding molecular alignment condition with no unevenness was obtainable.

EXAMPLE C10

Using a mixed LB film of a PIP, stearyl alcohol and liquid crystal (Melk's ZLI 3220) at a ratio of 1:1:1, a FLC cell having the ZLI 3489 as the liquid crystal to be sealably injected was prepared in the same way as in Example C1. The FLC cell thus prepared was subjected to the initial alignment treatment in such a manner that it is preliminarily heated to 100° C. and then cooled gradually. Thus, a FLC cell exhibiting an outstanding molecular alignment condition with no unevenness was obtainable.

EXAMPLE C11

Using a mixed LB film of a PIP, PIIQP, stearyl alcohol and liquid crystal (Melk's ZLI 3220) at a ratio of 1:1:1:1, a FLC cell having the ZLI 3489 as the liquid crystal to be sealably injected was prepared in the same way as in Example C1. The FLC cell thus prepared was subjected to the initial alignment treatment in such a manner that it is preliminarily heated to 100° C. and then cooled gradually. Thus, a FLC cell exhibiting an outstanding molecular alignment condition with no unevenness was obtainable.

EXAMPLE C12

Using a mixed LB film of a PIP and liquid crystal (Chisso's CS 1014) at a ratio of 1:1, a FLC cell having the ZLI 3489 as the liquid crystal to be sealably injected was prepared in the same way as in Example C1. The FLC cell thus prepared was subjected to the initial alignment treatment in such a manner that it is preliminarily heated to 100° C. and then cooled gradually. Thus, a FLC cell exhibiting an outstanding molecular alignment condition with no unevenness was obtainable.

EXAMPLE C13

Using a mixed LB film of a PIP, PIIQP and liquid crystal (Chisso's CS 1014) at a ratio of 1:1:1, a FLC cell having the ZLI 3489 as the liquid crystal to be sealably injected was prepared in the same way as in Example C1. The FLC cell thus prepared was subjected to the initial alignment treatment in such a manner that it is preliminarily heated to 100° C. and then cooled gradually. Thus, a FLC cell exhibiting an outstanding molecular alignment condition with no unevenness was obtainable.

EXAMPLE C14

Using a mixed LB film of a PIP, stearyl alcohol and liquid crystal (Chisso's CS 1014) at a ratio of 1:1:1, a FLC cell having the ZLI 3489 as the liquid crystal to be sealably injected was prepared in the same way as in Example C1. The FLC cell thus prepared was subjected to the initial alignment treatment in such a manner that it is preliminarily heated to 100° C. and then cooled gradually. Thus, a FLC cell exhibiting an outstanding molecular alignment condition with no unevenness was obtainable.

EXAMPLE C15

Using a mixed LB film of a PIP, PIIQP, stearyl alcohol and liquid crystal (Chisso's CS 1014) at a ratio of 1:1:1:1, a FLC cell having the ZLI 3484 as the liquid crystal to be sealably injected was prepared in the same way as in Example C1. The FLC cell thus prepared was subjected to the initial alignment treatment in such a manner that it is preliminarily heated to 100° C. and then cooled gradually. Thus, a FLC cell exhibiting an outstanding molecular alignment condition with no unevenness was obtainable.

EXAMPLE C16

Using a mixed LB film of a PIP and liquid crystal (Chisso's CS 1014) at a ratio of 1:1, a FLC cell having a Chisso's product trade-named as CS 1015 as the ferroelectric liquid crystal to be sealably injected was prepared in the same way as in Example C1. The FLC cell thus prepared was subjected to the initial alignment treatment in such a manner that it is preliminarily heated to 110° C. and then cooled gradually. Thus, a FLC cell exhibiting an outstanding molecular alignment condition with no unevenness was obtainable.

EXAMPLE C17

Using a mixed LB film of a PIP, PIIQP and liquid crystal (Chisso's CS 1014) at a ratio of 1:1:1, a FLC cell having the Chisso's CS 1015 as the ferroelectric liquid crystal to be sealably injected was prepared in the same way as in Example C1. The FLC cell thus prepared was subjected to the initial alignment treatment in such a manner that it is preliminarily heated to 110° C. and then cooled gradually. Thus, a FLC cell exhibiting an outstanding molecular alignment condition with no unevenness was obtainable.

EXAMPLE C18

Using a mixed LB film of a PIP, stearyl alcohol and liquid crystal (Chisso's CS 1014) at a ratio of 1:1:1, a FLC cell having the Chisso's CS 1015 as the ferroelectric liquid crystal to be sealably injected was prepared in the same way as in Example C1. The FLC cell thus prepared was subjected to the initial alignment treatment in such a manner that it is preliminarily heated to 110° C. and then cooled gradually. Thus, a FLC cell exhibiting an outstanding molecular alignment condition with no unevenness was obtainable.

EXAMPLE C19

Using a mixed LB film of a PIP, PIIQP, stearyl alcohol and liquid crystal (Chisso's CS 1014) at a ratio of 1:1:1:1, a FLC cell having the Chisso's CS 1015 as the ferroelectric liquid crystal to be sealably injected was prepared in the same way as in Example C1. The FLC cell thus prepared was subjected to the initial alignment treatment in such a manner that it is preliminarily heated to 110° C. and then cooled gradually. Thus, a FLC cell exhibiting an outstanding molecular alignment condition with no unevenness was obtainable.

In the above-described examples of this invention, furthermore, the vertical dipping method is used for the formation of LB films, but generally well-known rotatingcylinder method or horizontal adhesion method can be used for this purpose.

In addition, the liquid crystal to be used as a component of the LB film of this invention is not limited to the Melk's products trade-named ZLI 3220 and ZLI 3489.

Further the liquid crystal to be used for injection is not limited to the Melk's product tradenamed ZLI 3225. Still further the description is made on a TN-type liquid crystal display device and ferroelectric liquid crystal display device only, but this invention can be effectively applied to display devices which require effecting the alignment control of liquid crystal molecules other than the abovementioned ones.

What is claimed is:

1. The liquid crystal device comprising:
   a pair of substrates each having an electrode layer formed thereon and disposed so as to have the electrode layers formed thereon confronted to each other;
   a liquid crystal layer sandwiched between said pair of substrates; and
   a liquid crystal molecular alignment controlling film formed between at least one of said electrode layers and said liquid crystal layer, said liquid crystal molecular alignment controlling film containing a polyamide compound having a long-chain alkyl substituent in its side chain as a main component and being made of either a monomolecular film or a laminated monomolecular film of a mixture of said polyamide compound and a liquid crystal.

2. A liquid crystal device as claimed in claim 1, wherein said liquid crystal molecular alignment controlling film is made of either a monomolecular film or a laminated monomolecular film whose main component is a polyamide compound possessing a property to overspread on a surface of water thereby to form a monomolecular film.

3. The liquid crystal device as claimed in claim 1, wherein said polyamide compound having a long-chain alkyl substituent in its side chain is a compound which has a long-chain alkyl ester unit of polyamic acid.

4. A liquid crystal device comprising:
   a pair of substrates each having an electrode layer formed thereon and disposed so as to have the electrode layers formed thereon confronting each other;
   a liquid crystal layer sandwiched between said pair of substrates; and
   a liquid crystal molecular alignment controlling film formed between at least one of said electrode layers and said liquid crystal layer, said liquid crystal molecular alignment controlling film being made of either a monomolecular film or a laminated monomolecular film which contains a polyamide compound having a long-chain alkyl substituent in its side chain as the main component and said liquid crystal layer being made of a ferroelectric liquid crystal.

5. The liquid crystal device as claimed in claim 4, wherein said liquid crystal molecular alignment controlling film is made of either a monomolecular film or a laminated monomolecular film whose main component is a polyamide compound possessing a property to overspread on a surface of water thereby to form a monomolecular film.

6. The liquid crystal device as claimed in claim 4, wherein said liquid crystal molecular alignment controlling film contains a polyamide compound as the main component and is made of either monomolecular film or a laminated monomolecular film of a mixture of said polyamide compound and a liquid crystal.

7. The liquid crystal device as claimed in claim 4, wherein said polyamide compound having a long-chain alkyl substituent in its side chain is a compound which has a long-chain alkyl ester unit of polyamic acid.

* * * * *